United States Patent
Da et al.

(10) Patent No.: US 10,415,957 B1
(45) Date of Patent: Sep. 17, 2019

(54) ERROR CORRECTION METHOD FOR FRINGE PROJECTION PROFILOMETRY SYSTEM

(71) Applicant: SOUTHEAST UNIVERSITY, Nanjing (CN)

(72) Inventors: Feipeng Da, Nanjing (CN); Li Rao, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 180 days.

(21) Appl. No.: 15/574,853

(22) PCT Filed: Mar. 3, 2017

(86) PCT No.: PCT/CN2017/075600
§ 371 (c)(1),
(2) Date: Nov. 17, 2017

(87) PCT Pub. No.: WO2018/107584
PCT Pub. Date: Jun. 21, 2018

(30) Foreign Application Priority Data

Dec. 15, 2016 (CN) .......................... 2016 1 1159007

(51) Int. Cl.
*G01B 11/24* (2006.01)
*G01B 11/25* (2006.01)

(52) U.S. Cl.
CPC ...... *G01B 11/2433* (2013.01); *G01B 11/2504* (2013.01)

(58) Field of Classification Search
CPC .................. G01B 11/2433; G01B 11/2504
USPC .................................................. 356/601–640
See application file for complete search history.

(56) References Cited

FOREIGN PATENT DOCUMENTS

| CN | 103383249 A | 11/2013 |
| CN | 103557808 A | 2/2014 |
| CN | 103727898 A | 4/2014 |
| CN | 104236482 A | 12/2014 |
| CN | 105403172 A | 3/2016 |
| WO | 2004015368 A1 | 2/2004 |
| WO | 2016044014 A1 | 3/2016 |

OTHER PUBLICATIONS

Kong Weiqi et al., Calibration Method Based on General Imaging Model for Micro-Object Measurement System, Acta Optica Sinica, 30. Sep. 2016, No. 9, vol. 36.

*Primary Examiner* — Tri T Ton
(74) *Attorney, Agent, or Firm* — Gokalp Bayramoglu

(57) ABSTRACT

The present invention discloses an error correction method for an FPP system. Implementation steps are as follows: first, collecting deformed fringes affected by an object using a camera; then, calculating the fringe modulation I" by using the collected images, and normalizing the modulation; setting a segmentation threshold T, and for all pixels of which modulation I"<T, dividing them into several categories and pixels within each category having close I" values; for all pixels in each category, acquiring multiple groups of N intensity values, and averaging these groups of intensity values to obtain a set of averaged intensity value curves; and finally, replacing the corresponding N intensity values of all the pixels in the category with the set of averaged intensity values, to complete image correction.

6 Claims, 4 Drawing Sheets

ERROR CORRECTION METHOD FOR FRINGE PROJECTION PROFILOMETRY SYSTEM

CROSS REFERENCE TO RELATED APPLICATIONS

This application is the national phase entry of International Application No. PCT/CN2017/075600, filed on Mar. 3, 2017, which is based upon and claims priority to Chinese Patent Application No. 201611159007.3 filed on Dec. 15, 2016, the entire contents of which are incorporated herein by reference.

TECHNICAL FIELD

The present invention relates to three-dimensional reconstruction in a computer vision, and more particularly, to an error correction method for fringe projection profilometry systems.

BACKGROUND OF THE INVENTION

Fringe projection profilometry (FPP), as a three-dimensional measurement technology based on fringe projection, has been widely studied and applied in recent years, because it has advantages of high accuracy and high speed, and is less sensitive to ambient light. The FPP also has limitations as a three-dimensional measurement method based on active light projection. The most obvious one of the limitations is that an industrial camera used in a measurement system produces various noises during practical measurements. Such noises may reduce the signal-to-noise ratio of a collected image and affect the quality of a fringe image, and thus the quality of a calculated phase and the accuracy of the final three-dimensional reconstruction. This phenomenon becomes relatively serious especially when the measured object has low surface reflectance.

For an object with complicated surface texture, especially, with dark texture, the signal-to-noise ratio of images collected by the FPP system is relatively low, and as a result, the quality of the phase information obtained from dark textures in the captured image is poor. To solve such a problem, most existing solutions either increase the size of the camera aperture, the shutter speed, and the camera gain; or entirely enhance the intensity of projected light of a projector, such that the part of captured images with dark texture is sufficiently exposed. This method can effectively improve phase information of dark textures. However, the increased camera aperture size, shutter speed, and camera gain may saturate part of the image, that is, the intensity value of the images reaches 255 (for an industrial camera with an 8-digit image format). Especially, when the surface texture of an object is rather dark, this method causes severe image saturation. In addition, this method usually needs to measure an object many times, and then combine different measurement results into one final result. An operation in the whole measurement process is rather complicated and it is difficult to quantify the adjustment of camera parameters.

The dark surface texture affects the quality of the fringe image in the following two aspects: sampling performance of the camera and random noises. An influence of the sampling performance of the camera on the quality of the fringe image may be relieved by using a digital camera with larger image depth or using the foregoing methods of repeated exposure and adjustment of projector brightness. The random noises need to be compensated by additionally setting an algorithm, which is the primary objective of this invention.

SUMMARY OF THE INVENTION

Technical Problem

An obvious phase error occurs when an FPP system measures an object with dark texture. To address this problem, the present invention provides a method for correcting a final phase error by analyzing modulation of captured fringe images and directly correcting the images. This method requires no additional hardware except a typical FPP system, does not need to measure the same object many times, and achieves phase error compensation for a low-reflectance part only by analyzing modulation information of the fringe pattern.

Technical Solution

To achieve the foregoing objective, the present invention uses the following technical solution:

An error correction method for an FPP system includes:

(1) projecting N phase-shifting sinusoidal fringe images onto a surface of an object to be measured with a projector, and collecting the images using a camera;

(2) calculating fringe modulation based on the collected N phase-shifting fringe patterns;

(3) determining the low-reflectance area on the surface of the object based on the calculated modulation, the corresponding image pixels are the pixels to be processed;

(4) classifying all pixels to be processed according to the modulation, wherein pixels of the same category have similar modulation;

(5) with each category comprising multiple pixels and each pixel corresponding to a group of N intensity values, averaging intensity values at corresponding positions of said multiple groups of N intensity values of these pixels; and then replacing original intensity values of pixels with the averaged values, to achieve image correction; and (6) calculating the absolute phase based on the corrected images, and finally obtaining the three-dimensional information of the object.

The equation used to calculate the modulation I″ based on the collected N phase-shifting fringe patterns $I_i$, i=1, 2, . . . , N in step (2) is as follows:

$$I'' = \frac{2}{N}\sqrt{((\sum I_i \cos\delta_i)^2 + (\sum I_i \sin\delta_i)^2)}$$

in which δ is an amount of phase shift of each step.

Preferably, after the modulation are calculated in step (2), the modulation are normalized to the interval of [0,1]:

$$I_z'' = (I'' - I_{min}'')/(I_{max}'' - I_{min}'')$$

in which $I_z''$ is the normalized modulation; $I_{max}''$ and $I_{min}''$ represent a maximum and a minimum of the calculated modulation I″, respectively.

In step (3), by setting a segmentation threshold, pixels with normalized modulation smaller than the set threshold are determined as the pixels to be processed, in which, preferably, the segmentation threshold ranges from 0.25 to 0.4.

In step (4), by setting a minimum threshold, pixels for which corresponding modulation difference of any two pixels is less than the set threshold are classified into the same category, in which, preferably, the minimum threshold ranges from 0.008 to 0.012.

An equation used to calculate the absolute phase in step (6) is as follows:

$$\phi = \arctan\left[\frac{\sum_{n=1}^{N} I_n^c \sin(2\pi n/N)}{\sum_{n=1}^{N} I_n^c \cos(2\pi n/N)}\right]$$

in which $I_n$ is an intensity value of the $n^{th}$ corrected image.

Advantageous Effect

The present invention provides a method to correct errors introduced during an FPP system measuring objects with low surface reflectance. The method has the following advantageous effect in comparison with the prior art:

To address the problem that a conventional FPP system tends to cause phase errors when measuring an object with dark textures, the present invention provides a phase error correction algorithm based on the analysis of fringe modulation. During three-dimensional measurement based on fringe projection, pixels in the formed images corresponding to points with the same surface reflectance on an object have the same modulation, and image noise corresponding to these pixels with the same modulation also has the same variance. Therefore, in actual measurement, pixels with small modulation are classified, and modulation corresponding to multiple pixels in each category are approximately equal (a difference between any two modulations is less than 0.008 to 0.012). If considering these pixels as multiple samples taken from points with the same reflectance on the object, similar mean filtering operations may be performed on the groups of N intensity values to which these pixels corresponding. Processed fringe patterns can be used to acquire a corrected phase. Different from the methods of multiple exposures and changing of projector brightness, the algorithm of the present invention has a simple implementation process, does not need to measure the same object many times, and can effectively reduce the influence of random noises on the calculated phase with a pure mathematical solution, thus obviously enhancing the quality of a phase corresponding to an area with dark texture, and improving the accuracy of three-dimensional reconstruction corresponding to the dark texture.

DETAILED DESCRIPTION OF THE INVENTION

The present invention is further illustrated with reference to the accompanying drawings and specific embodiments. MATLAB is selected as the programming tool in the Windows operating system, to process sinusoidal fringe generated by a computer and a fringe image collected by a CCD camera. This embodiment uses a white plane with black texture as an object to be measured, to demonstrate the effectiveness of an error correction method provided by this invention. It should be understood that these embodiments are merely used to illustrate the present invention and are not intended to limit the scope of the present invention. Various equivalent modifications of the present invention made by those skilled in the art after reading the present invention, all fall within the scope defined by the appended claims of the present application.

Figure 1:
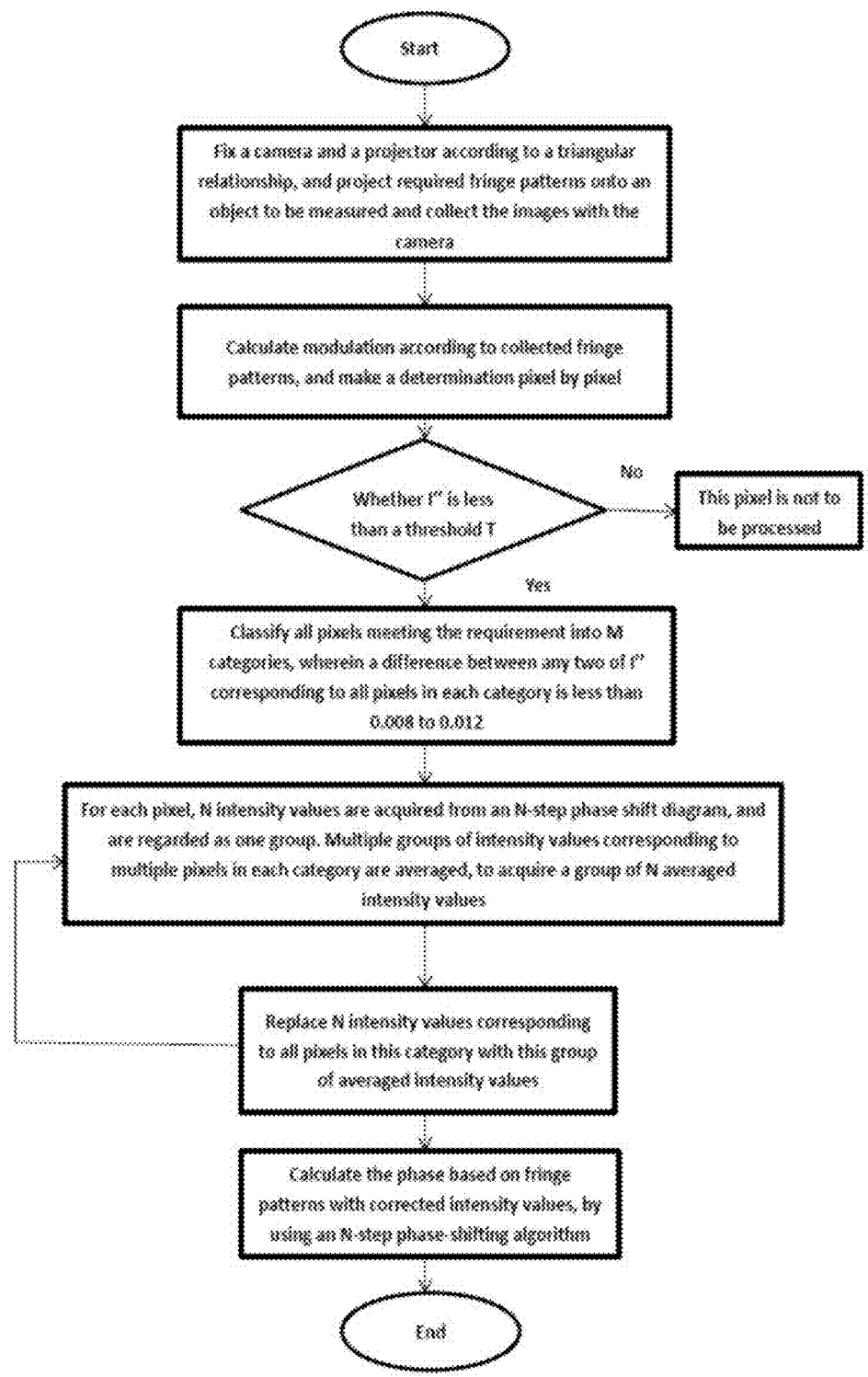
FIG. 1 is a flowchart of a whole process of the present invention.
Figure 2:
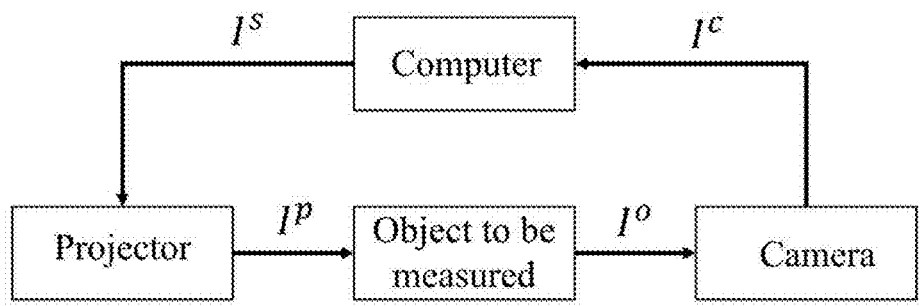
FIG. 2 is a block diagram of an FPP system.

The embodiment of the present invention discloses a method to correct errors introduced during an FPP system measuring a low-reflectance object. First, N phase-shifting sinusoidal fringe images are projected onto the surface of an object to be measured with a projector, and the images are collected by using a camera; then, modulation are calculated based on the collected N phase-shifting fringe patterns; the low-reflectance part on the surface of the object is determined based on the modulation, in which corresponding pixels are pixels to be processed; subsequently, all pixels to be processed are classified according to the modulation and intensity values at corresponding positions of said multiple groups of N gray values of multiple pixels in each category are averaged, and then original intensity values of pixels are replaced with the averaged values, to achieve image correction; and finally, the absolute phase is calculated based on the corrected images, and three-dimensional information of the object is finally calculated. The main process of the algorithm is shown in FIG. 1. A structural block diagram of the measurement system is shown in FIG. 2. $I^s$ is a standard phase-shifting fringe pattern for measurement generated by the computer. $I^p$ is a fringe pattern projected by the projector. $I^o$ and $I^c$ are respectively a fringe pattern obtained after reflection from the object and a final fringe pattern collected by the camera. In the whole process of fringe collection, the quality of the collected fringe patterns determines the phase quality, and also affects the accuracy of final three-dimensional reconstruction. For an object to be measured with dark texture, the calculated phase is obviously affected. In this invention, modulation of the collected fringes is analyzed, and intensity values of the fringes are statistically processed, thus effectively reducing the phase error of the dark texture and improving the overall reconstruction accuracy.

A specific implementation of the embodiment of the present invention includes the following steps:

Step 1: A projector and a camera are fixed according to a triangular relationship in a three-dimensional measurement system based on active light projection, and an object to be measured with complicated surface texture is placed at a suitable position. N required phase-shifting sinusoidal fringe images I are projected on the object by using the projector, wherein a fringe intensity value is set as follows:

$$I(i,j)=255[1+\cos(2\pi i/p+\varphi)]/2$$

in which I(i,j) is an intensity value of the fringe image I at row i and column j, p is a fringe period, and φ is the phase step. For simplicity, pixel coordinates (i,j) are omitted in the following description.

Figure 3:
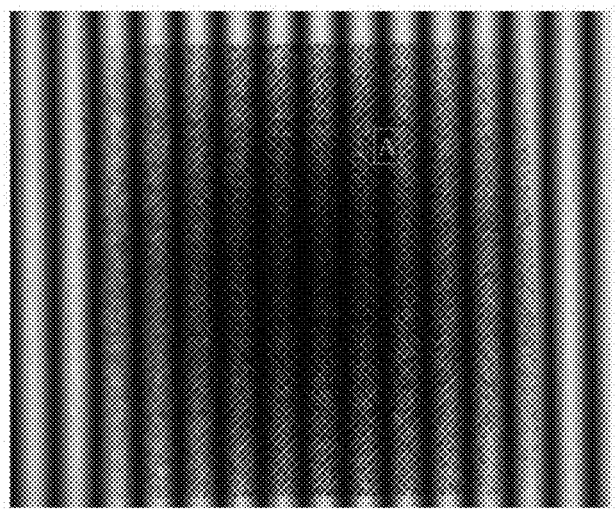
FIG. 3 is a schematic diagram of an object to be measured with abundant texture.

Step 2: Related parameters of the camera: the size of an aperture, a shutter speed, and light sensitivity are set appropriately, so that no image saturation (that is, the intensity value of the brightest area is less than 255) occurs in collected images. N fringe patterns are collected with such camera parameters. FIG. 3 shows one of collected phase-shifting fringe patterns. Intensity values of collected fringes are as follows:

$$I_n = I' + I'' \cos[\phi + 2\pi n/N]$$

in which n=1,2, . . . , N, $I_n$ is an intensity value of the $n^{th}$ collected image, I' is a background value of light intensity of the fringe, I" is modulation strength, φ is distribution of absolute phases to be found. I' and I" have the same resolution with the fringe pattern $I_n$.

Step 3: For the fringe patterns collected in step 2, modulation I" of the fringe patterns are calculated and normalized. I" indicates the reflectance information of each pixel on the surface of the captured object, and has a one-to-one correspondence with pixels of the images collected in step 2. A method for calculating the modulation of the fringes is as follows:

Step 3.1: For the collected N phase-shifting fringe patterns $I_i$, i=1, 2, . . . , N, the modulation of the fringes are calculated by using the following equation:

$$I'' = \frac{2}{N}\sqrt{((\sum I_i \cos\delta_i)^2 + (\sum I_i \sin\delta_i)^2)}$$

in which $\delta_i$ is an amount of phase shift of each step.

A method for normalizing the modulation of the fringes in step 3 is as follows:

Step 3.2: The calculated modulation I" are normalized to an interval of 0 to 1 according to the following equation:

$$I_z'' = (I'' - I_{min}'')/(I_{max}'' - I_{min}'')$$

in which $I_z''$ is a normalized modulation, and $I_{max}''$ and $I_{min}''$ respectively represent a maximum and a minimum of the calculated modulation I".

Step 4: A threshold T is set within an interval of 0.25 to 0.4, for example, T=0.3, and threshold segmentation is performed on the modulation I" normalized in step 2. Pixels of which modulation values are smaller than the threshold may be taken as a low-reflectance part with dark texture on the surface of the object, which is a part to be processed according to this invention. Pixels of which modulation values are higher than the threshold are taken from highly reflective surface area, which is not processed in the present application. The threshold T is specifically selected according to different measurement scenarios. In different scenarios, the modulation I" are analyzed. The larger is the difference between the maximum $I_{max}''$ and the minimum $I_{min}''$ of the modulation prior to normalization, the smaller should the threshold T be set to, i.e., T should be set closer to 0.25. Similarly, the smaller is the difference, the closer should T get set to 0.4. For each pixel to be processed by this invention, N intensity values can be obtained from the N phase-shifting fringe patterns, and the N intensity values are sinusoidally distributed.

Figure 4:
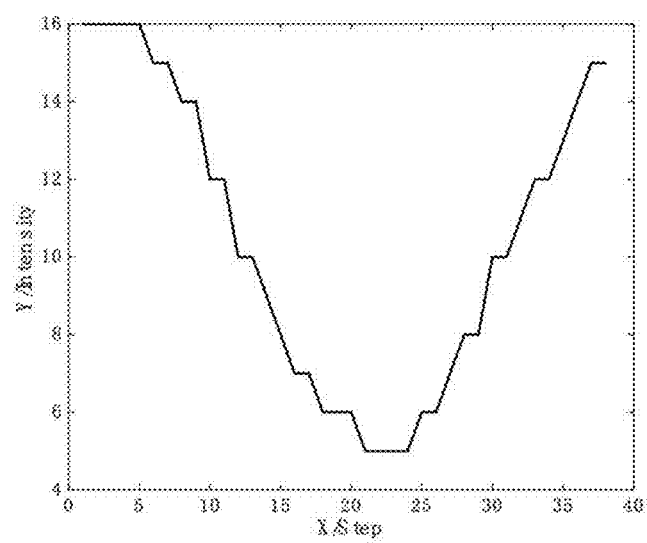
FIG. 4 is a graph of N intensity values corresponding to a pixel at dark texture.

FIG. 4 is a graph of N intensity values corresponding to point A in FIG. 3. The point A is a pixel with reflectance of 0.1 at the dark texture area on the object. It is easily found that the sinusoidal property is poor under an influence from sampling performance of the camera and random noises.

Step 5: All pixels to be processed in step 3 are further classified into M categories. The classification rule is that a difference in modulation I" between any two pixels in each category does not exceed the set threshold. The threshold may be selected from the range 0.008 to 0.012, for example, 0.01. The multiple pixels in each category may be approximately regarded as being collected from a texture part corresponding to the same reflectance on the object.

Figure 5:
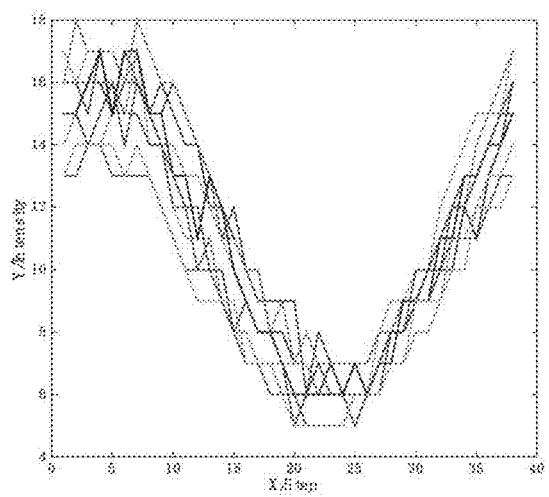
FIG. 5 is a schematic graph of multiple groups of N intensity values corresponding to multiple pixels in one of M categories.

FIG. 5 shows the intensity value curves of 10 pixels of the same category as the point A shown in FIG. 3. It can be seen that sinusoidal properties of the intensity value curve corresponding to these 10 pixels are rather poor under an influence from the random noises and the sampling performance.

Step 6: Multiple pixels in each one of the M categories can be considered as multiple samples of the surface points having the same reflectance. If there are Q pixels in one category, $I_n^{(q)}$ indicates the intensity value of the $q^{th}$ pixel in a diagram showing the $n^{th}$-step phase shift, in which q=1, 2, . . . , Q and n=1, 2, . . . , N. For a phase shift of each step n, the following averaging operation is performed:

$$I_n^r = \frac{1}{Q}\sum_{q=1}^{Q} I_n^{(q)}$$

Figure 6:
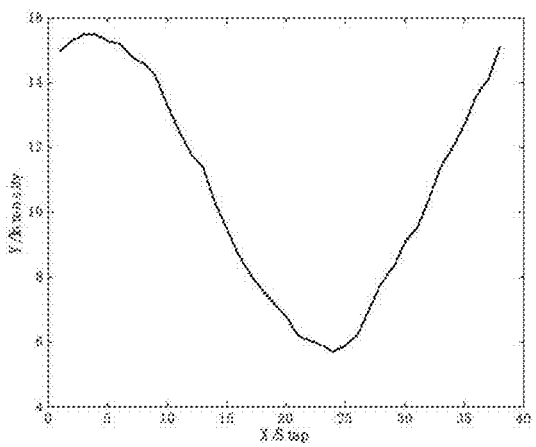
FIG. 6 is a graph of averaged values of data in FIG. 4.

$I_n^r$ is the averaged intensity value obtained after the averaging operation. Such an averaging operation may effectively reduce the influence of the random noises on the sinusoidal property of distribution of the N intensity values. N intensity values obtained after the averaging operation are used to replace N intensity values corresponding to all original pixels in this category, thus completing correction of intensity values in this category. FIG. 6 shows the averaged values of intensity values corresponding to the 10 pixels in FIG. 5. By comparing FIG. 4 with FIG. 6, it can be found that sinusoidal property of FIG. 6 is far better than the property prior to correction shown in FIG. 4. Such a correction operation is repeated for all the M categories, thus completing the correction of original images. The corrected images may be used to acquire a more accurate phase. A phase calculation equation is as follows:

$$\phi = \arctan\left[\frac{\sum_{n=1}^{N} I_n^r \sin(2\pi n/N)}{\sum_{n=1}^{N} I_n^r \cos(2\pi n/N)}\right]$$

Figure 7:
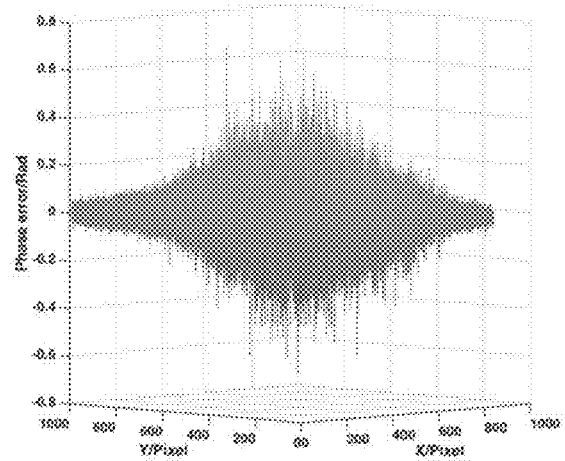
FIG. 7 is a diagram showing a phase error result before correction with a method of this invention.
Figure 8:
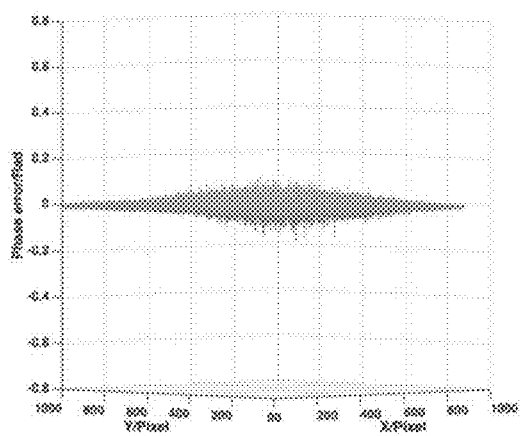
FIG. 8 is a diagram showing the phase error result after correction with the method of this invention.

The same object is measured 20 times through 38-step phase shift, and an average value of phases found for the 20 times is used as the standard phase. Differences between phase values found for a fringe pattern before and after correction and the standard phase are shown in FIG. 7 and FIG. 8 respectively. It can be found that, the phase quality is obviously improved after correction using the method of this invention, and an average phase error is reduced to ⅕ of that before correction.

Figure 9:
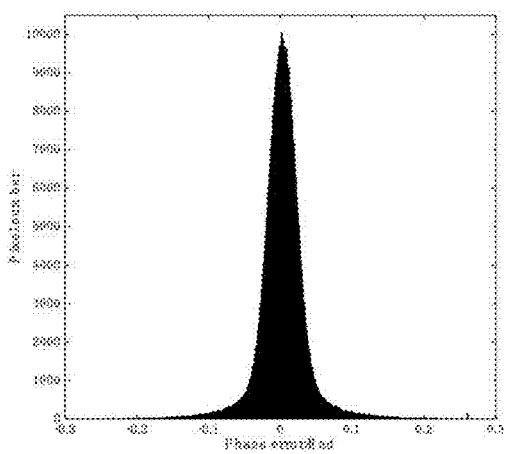
FIG. 9 is a histogram of the phase error before use of the correction method of this invention.
Figure 10:
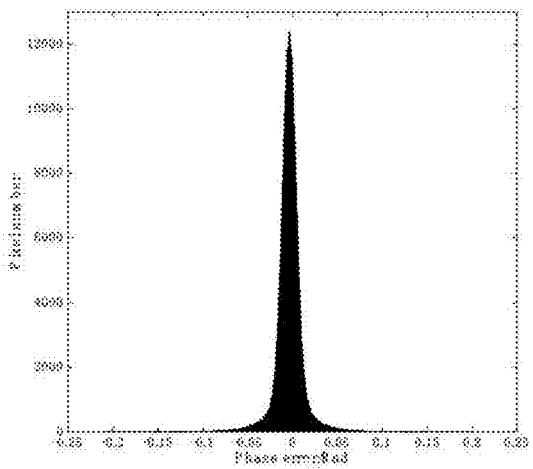
FIG. 10 is a histogram of the phase error after use of a correction method of this invention.

FIG. 9 and FIG. 10 are the histograms of phase errors before and after the error compensation described above, in which the phase errors caused by random noises are zero-mean Gaussian distributed. It can be seen that the variance of the phase error is obviously reduced after using the error correction method of this invention.

Step 7: The relative phase is unwrapped to obtain the absolute phase, and three-dimensional information of the measured object can be finally calculated according to the classical phase-to-height conversion equation in fringe projection.

The description above merely provides the preferred embodiments of the present invention. It should be noted that, several variations and modifications can be made by those of ordinary skill in the art without departing from the principles of the invention. These variations and modifications shall be construed as being within the scope of the present invention.

What is claimed is:

1. An error correction method for a fringe projection profilometry system, comprising:
   (1) projecting N phase-shifting sinusoidal fringe images onto a surface of an object to be measured with a projector, and collecting the images using a camera;
   (2) calculating modulation based on the collected N phase-shifting fringe patterns;
   (3) determining a low-reflectance part on the surface of the object based on the modulation, wherein corresponding pixels are pixels to be processed;
   (4) classifying all pixels to be processed according to the modulation, wherein pixels of the same category have similar modulation;
   (5) averaging multiple groups of N intensity values of pixels at corresponding positions, wherein for multiple pixels in each category, each pixel corresponds to a group of N intensity values; and then replacing original intensity values of pixels with the averaged values, to achieve image correction; and
   (6) calculating the absolute phase based on the corrected images, and finally obtaining the three-dimensional information of the object.

2. The error correction method for a fringe projection profilometry system according to claim 1, wherein an equation used to calculate the modulation I″ based on the collected N phase-shifting fringe patterns $I_i, i=1, 2, \ldots, N$ in step (2) is as follows:

$$I'' = \frac{2}{N} \sqrt{((\sum I_i \cos \delta_i)^2 + (\sum I_i \sin \delta_i)^2)}$$

in which $\delta_i$ is an amount of phase shift of each step.

3. The error correction method for a fringe projection profilometry system according to claim 1, wherein after the modulation are calculated in step (2), the modulation are normalized to an interval [0,1]:

$$I_z'' = (I'' - I_{min}'')/(I_{max}'' - I_{min}'')$$

in which $I_z''$ is a normalized modulation; $I_{max}''$ and $I_{min}''$ respectively represent a maximum and a minimum of the calculated modulation I″.

4. The error correction method for a fringe projection profilometry system according to claim 3, wherein in step (3), by setting a segmentation threshold, pixels with normalized modulation lower than the set threshold are determined as the pixels to be processed, in which the segmentation threshold ranges from 0.25 to 0.4.

5. The error correction method for a fringe projection profilometry system according to claim 3, wherein in step (4), by setting a minimum threshold, pixels for which corresponding modulation difference of any two pixels is less than the set threshold are classified into the same category, in which the minimum threshold ranges from 0.008 to 0.012.

6. The error correction method for a fringe projection profilometry system according to claim 1, wherein an equation used to calculate the absolute phase in step (6) is as follows:

$$\phi = \arctan \left[ \frac{\sum_{n=1}^{N} I_n^r \sin(2\pi n/N)}{\sum_{n=1}^{N} I_n^r \cos(2\pi n/N)} \right]$$

in which $I_n^r$ is the intensity value of the $n^{th}$ corrected image.

* * * * *